United States Patent
Palmer et al.

(10) Patent No.: US 7,606,884 B2
(45) Date of Patent: Oct. 20, 2009

(54) SNMP FIREWALL FOR NETWORK IDENTIFICATION

(75) Inventors: John Palmer, San Gabriel, CA (US); George O. Vazquez, Sherman Oaks, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 1496 days.

(21) Appl. No.: 10/234,913

(22) Filed: Sep. 4, 2002

(65) Prior Publication Data
US 2004/0044758 A1 Mar. 4, 2004

(51) Int. Cl.
G06F 15/173 (2006.01)

(52) U.S. Cl. .............. 709/223; 709/206; 709/222; 709/224; 709/246; 709/230; 714/4; 714/47; 714/48; 726/11

(58) Field of Classification Search ......... 709/223–225, 709/245, 238, 229; 370/399, 401, 392, 235, 370/232; 713/154, 162
See application file for complete search history.

(56) References Cited

U.S. PATENT DOCUMENTS

| | | | |
|---|---|---|---|
| 6,003,077 A | 12/1999 | Bawden et al. | |
| 6,032,183 A | 2/2000 | Chen et al. | |
| 6,085,237 A | 7/2000 | Durham et al. | |
| 6,144,638 A * | 11/2000 | Obenhuber et al. | 370/231 |
| 6,154,839 A * | 11/2000 | Arrow et al. | 713/154 |
| 6,167,052 A * | 12/2000 | McNeill et al. | 370/399 |
| 6,182,157 B1 | 1/2001 | Schlener et al. | |
| 6,360,258 B1 | 3/2002 | LeBlanc | |
| 6,523,068 B1 * | 2/2003 | Beser et al. | 709/238 |
| 6,693,878 B1 * | 2/2004 | Daruwalla et al. | 370/235 |
| 6,847,614 B2 * | 1/2005 | Banker et al. | 370/252 |
| 7,024,476 B1 * | 4/2006 | Page et al. | 709/224 |
| 7,035,281 B1 * | 4/2006 | Spearman et al. | 370/465 |
| 7,093,008 B2 * | 8/2006 | Agerholm et al. | 709/223 |

(Continued)

OTHER PUBLICATIONS

"Application of virtual private networking technology to standards-based management protocols across heterogeneous firewall-protected networks" O'Guin, S.; Williams, C.K.; Selimis, N.; Military Communications Conference Proceedings, 1999. MILCOM 1999, IEEE vol. 2, Oct. 31-Nov. 3, 1999 pp. 1251-1255 vol. 2 Digital Object Identifier 10.1109/MILCOM.1999.821404.*

(Continued)

*Primary Examiner*—Jude J Jean Gilles
(74) *Attorney, Agent, or Firm*—Tarolli, Sundheim, Covell & Tummino LLP (57) ABSTRACT

Systems and methods are provided for exchanging Small Network Management Protocol (SNMP) messages in a multi-network system between devices across different networks and a network management station. Network identification information is provided into SNMP messages transmitted across a common network backbone. A respective SNMP firewall provided at the networks extract the network identification information to determine if the SNMP message is addressed to a device in the respective network. The SNMP firewall removes the network identification information and forwards the SNMP message to the destination device if the SNMP message is associated with a device in the respective network. Providing network identification information in the SNMP messages allows devices in different networks to have similar IP addresses, while still allowing current SNMP tool sets to facilitate network managements when networks are coupled to one another to form a larger more complex network.

28 Claims, 8 Drawing Sheets

U.S. PATENT DOCUMENTS

| | | | |
|---|---|---|---|
| 7,313,626 B2* | 12/2007 | Sabat et al. | 709/229 |
| 2002/0052946 A1* | 5/2002 | Yoshino | 709/223 |
| 2002/3065908 | 5/2002 | Jensen | |
| 2002/0159447 A1* | 10/2002 | Carey et al. | 370/389 |
| 2003/0217282 A1* | 11/2003 | Henry | 713/200 |

OTHER PUBLICATIONS

Simple Network Management Protocol, http://www.cisco.com/univercd/cc/td/doc/cisintwk/ito_doc/snmp.pdf, Cisco's Internetworking Handbook.*

Dailianas A et al: "MarketNet: market-based protection of network systems and services—an application to SNMP protection" INFOCOM 2000. Nineteenth Annual Joint Conference of the IEEE Computer and Communications Societies. Proceedings. IEEE Tel Aviv, Israel Mar. 26-30, 2000, Piscataway, NJ USA IEEE, US, Mar. 26, 2000, pp. 1391-1400, XP010376075 ISBN: 0-7803-5880-5 p. 1396, left-hand column, line 7, right-hand column, line 6 figure 5.

European Search Report in Serial No. EP 03 25 5367; Date of Complettion Dec. 11, 2003.

* cited by examiner

| NETWORK IPADDRESS | IPADDRESS |
|---|---|
| NET A 192.196.1.1 | 192.196.1.1 |
| NET A 192.196.1.2 | 192.196.1.2 |
| NET A 192.196.1.3 | 192.196.1.3 |
| NET B 192.196.1.1 | 192.196.1.1 |
| NET B 192.196.1.2 | 192.196.1.2 |
| NET C 192.196.1.1 | 192.196.1.1 |
| NET C 192.196.1.2 | 192.196.1.2 |
| NET C 192.196.1.3 | 192.196.1.3 |
| NET C 192.196.1.4 | 192.196.1.4 |

| VIRTUAL IPADDRESS | IPADDRESS |
|---|---|
| 861.196.1.1 | 192.196.1.1 |
| 861.196.1.2 | 192.196.1.2 |
| 861.196.1.3 | 192.196.1.3 |
| 862.196.1.1 | 192.196.1.1 |
| 862.196.1.2 | 192.196.1.2 |
| 863.196.1.1 | 192.196.1.1 |
| 863.196.1.2 | 192.196.1.2 |
| 863.196.1.3 | 192.196.1.3 |
| 863.196.1.4 | 192.196.1.4 |

SNMP FIREWALL FOR NETWORK IDENTIFICATION

TECHNICAL FIELD

The present invention relates to communications and, more particularly, to systems and methods for exchanging small network management protocol (SNMP) messages in large complex networks.

BACKGROUND OF THE INVENTION

Managing and monitoring connected devices in a network is important for network administrators in local area network applications and other much larger more complex networks. Network management systems are utilized to monitor, interpret and control the operation of a network. Typically, the network management system includes agents that reside on network devices that monitor and accumulate operational data and detect exceptional events. A manager is provided at a network management station that can request operational data and/or receive event notifications from one or more network devices via the network device agents. The manager can be equipped to interpret the operational data and/or received event notifications from the agents. Additionally, the manager can be equipped to effect control of network operations by transmitting command requests to the agents, which then execute the command requests.

Several protocols have been developed to enable management and monitoring of devices connected to a network. These protocols often include objects and procedures for accessing information associated with a network attached device. The Simple Network Management Protocol (SNMP) is an example of a relatively well known protocol for managing and monitoring network devices. The SNMP protocol uses User Datagram Protocol (UDP) packets to send and receive the information sent back and forth between management software and SNMP agents. SNMP was developed to provide a tool for multi-vendor, interoperable network management. SNMP includes a set of standards for network management including a protocol, database structure specification and a set of data objects. Network administrators can address queries and commands to network nodes and devices. SNMP monitors network performance and status, controls operational parameters and reports, analyzes and isolates faults. The protocol does these functions by transporting management information between "Managers" and "Agents".

SNMP defines three basic components, an agent, a manager and a Management Information Base (MIB). An agent is a component that resides within a managed network device such as a host, gateway, or terminal server. Each agents stores management data and respond to management request for data. An agent can also send an unsolicited SNMP message referred to as a "TRAP" to a manager after sensing a predefined condition. A manager is a component that resides in a network management station. The manager provides an administrator with the functionality to transmit query and control commands to an agent. A MIB is a managed object database, accessible to agents and manipulated via SNMP for network management application. For example, the MIB may specify data variables which track statistics on the status of network traffic, incoming and outgoing data and failures (e.g., routing failures).

SNMP specifies five types of commands or verbs called Protocol Data Units (PDUs): GetRequest, GetNextRequest, SetRequest, GetResponse and Trap. Agents retrieve management data after receiving a GetRequest or a GetNextRequest. Manager use GetNextRequest to retrieve single values of the managed objects. The GetNextRequest is issued by the manager to begin a primitive block transfer and the agent returns the selected data with a GetResponse verb. Managers use SetRequest commands for instructing agents to alter MIB variables, while "TRAPS" are unsolicited messages sent by agents to managers after sensing predefined conditions. The second version of SNMP introduced two additional operations: Inform and GetBulk. Inform allows one manager to send trap type information to another manager and request a response. GetBulk allows a manager to retrieve efficiently large blocks of data, such as multiple rows in a table, which would otherwise require the transmission of many small blocks of data.

SNMP was originally designed for network management of single networks. However, recently the need and ability to interconnect networks has evolved. New technologies have emerged to make it possible to interconnect many disparate physical networks and make them function as a single coordinated unit. Internetworking makes is possible for a host to communicate with hosts on different networks. The size of an internet or group of interconnected networks can be quite large and complex making network management more complex. Some tools such as SNMP have not been designed to operate in such large networks. For example, devices on networks can include similar Internet Protocol (IP) addresses. When the networks are connected to one another, the IP addresses are duplicated. SNMP has no mechanism to differentiate between devices with similar IP addresses amongst different interconnected networks. Conventionally, a network administrator would have to reconfigure devices on the network to eliminate duplicate IP addresses prior to utilizing SNMP as a network management tool for large complex interconnected networks.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

The present invention relates to systems and methods for providing network identification information into SNMP messages, and utilizing the network identification information to transmit the SNMP messages to a destination device (e.g., a computer, a router, a bridge, a printer and a mobile communication unit) in a network that is coupled to a plurality of other networks. Providing network identification information in the SNMP messages allows devices in different networks to have similar IP addresses, while still allowing current SNMP tool sets to facilitate network management when networks are coupled to one another to form a larger more complex network (e.g., internet).

In one aspect of the invention, a network management station is provided that includes a user interface that allows a network administrator to input SNMP commands that include network identifier information and a device address in the command. An SNMP manager translates the network identifier information and inserts the network identifier information into an SNMP packet or message. The SNMP packet or message is then transmitted over a common network backbone that joins a plurality of networks. A respective SNMP firewall is provided at one or more of the plurality of networks. The SNMP firewall monitors the SNMP packets to determine if the network identifier information corresponds to the SNMP firewall network. If the SNMP packet is destined for a device in the SNMP firewall network, the SNMP firewall extracts the network identification information from the SNMP packet and forwards the packet to the destination device.

In another aspect of the invention, an SNMP agent residing on a destination device transmits SNMP responses and SNMP events associated with the SNMP agent. The SNMP firewall provides the SNMP responses and SNMP events with network identification information. The SNMP response or message is then transmitted across the common network backbone to a network management station. The SNMP firewall utilizes a lookup table to provide a one-to-one mapping or pseudo address to an actual IP address of a device.

To the accomplishment of the foregoing and related ends, certain illustrative aspects of the invention are described herein in connection with the following description and the annexed drawings. These aspects are indicative, however, of a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF INVENTION

The present invention relates to systems and methods for exchanging SNMP messages between devices residing across a plurality of different networks joined together by a common network backbone. The system and methods utilize network identification information to transmit the SNMP messages to a destination device residing in a network. Providing network identification information in the SNMP messages allows devices in different networks to have similar IP addresses, while still allowing SNMP tools to facilitate network managements when networks are coupled to one another to form a larger more complex network (e.g., internet). Therefore, devices of previously configured networks do not have to be reconfigured manually to alleviate the problem of duplicate IP addresses when the networks are joined together.

Figure 1:
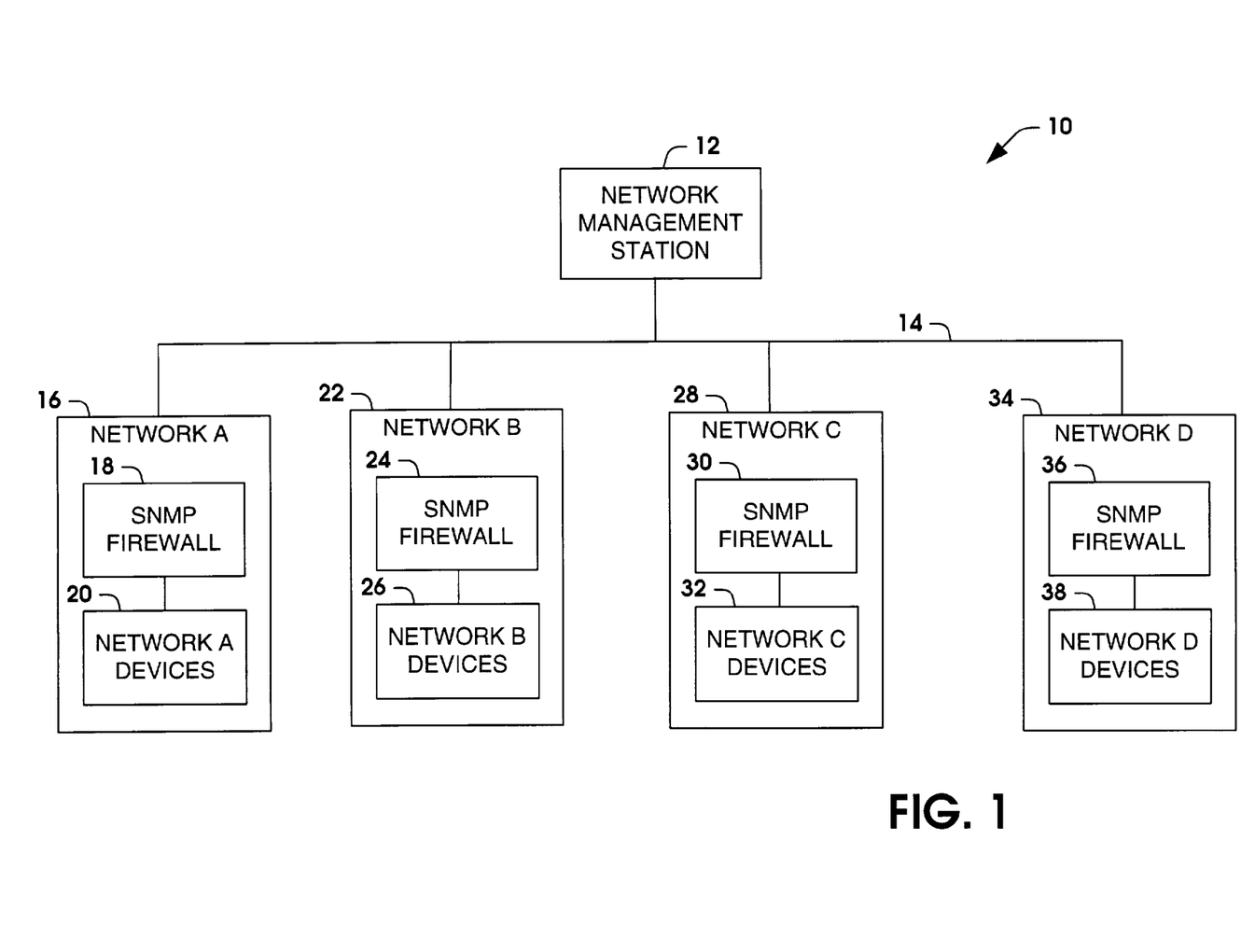
FIG. 1 illustrates a block diagram of a system having a plurality of networks in accordance with an aspect of the present invention.

FIG. 1 illustrates a system 10 comprising a plurality of networks joined to one another by a common network backbone 14. The network backbone 14 can be a hardwired data communication path made of twisted pair cable, shielded coaxial cable or fiber optic cable, for example, or may be wireless or partially wireless in nature. A network management station 12 is provided coupled to the network backbone 14. The network management station 12 allows a system administrator to transmit and receive MIB variables of SNMP agents residing on different networks via SNMP PDUs. The network management station 12 transmits and receives SNMP packets or messages to and from a particular device at a particular network. The network management station 12 translates the IP address of the device in the SNMP packet so that it is also provided with network identification information. For example, the network management station 12 can translate the IP address of the device by adding a network identifier to the SNMP packet. Alternatively, the network management station 12 can translate the IP address of the device into a virtual address to be transmitted over the backbone 14.

A destination network is provided with an SNMP firewall that filters out the modified SNMP packets to determine if the packet is destined for the respective network. If the SNMP packet is destined for the respective network, the SNMP firewall translates the modified SNMP packet address back to the original IP address and forwards the SNMP packet to the destination device. The destination device then transmits a response in a conventional manner. The SNMP firewall then retranslates the address residing in the response from the destination device and transmits the response back over the network backbone 14 to the network management station 12. Additionally, event information such as that occurring in a "TRAP" PDU defined at the device will have network identifier information incorporated into the SNMP packet by the SNMP firewall prior to transmission to the network management station 12. Therefore, devices with similar IP addresses can reside in the system without being modified by the system administrator since the network management station 12 and the SNMP firewalls cooperate to resolve the appropriate destination for transmission and reception of SNMP management messages.

In the example of FIG. 1, a first network 16, labeled network A, includes an SNMP firewall 18 and a plurality of network devices 20. A second network 22, labeled network B, includes an SNMP firewall 24 and a plurality of network devices 26. A third network 28, labeled network C, includes an SNMP firewall 30 and a plurality of network devices 32, and a fourth network 34, labeled network D, includes an SNMP firewall 36 and a plurality of network devices 38. SNMP messages pass between the network management station 12 and a destination device residing on a respective network through a respective network SNMP firewall. The SNMP firewall translates the address in the SNMP messages to include or remove network identifier information, so that messages are received by the appropriate destination device regardless if devices in different networks have similar IP addresses.

For example, a network administrator may wish to execute the following command to a machine on network B: $ snmpget 192.168.0.2 public.1.3.6.1.2.1.1.6.0. However, a device in network A and a device in network C may have the same IP address. Therefore, there is not guarantee that the command will reach the proper machine. In accordance with an aspect of the present invention, an administrator issues a similar command such as: $ snmpget B192.168.0.2 public.1.3.6.1.2.1.1.6.0. where B identifies the particular network hosting the destination device. The network management station 12 would then insert the network identifier information in the messages passed from the network management station 12 over the network backbone. The destination network SNMP firewall 24 would then determine if the SNMP message included a network or community identifier for that network, and forward the SNMP message to the desired destination device 26. A similar approach is followed for responses from the devices regarding event information transmitted to the network management station 12.

Figure 2:
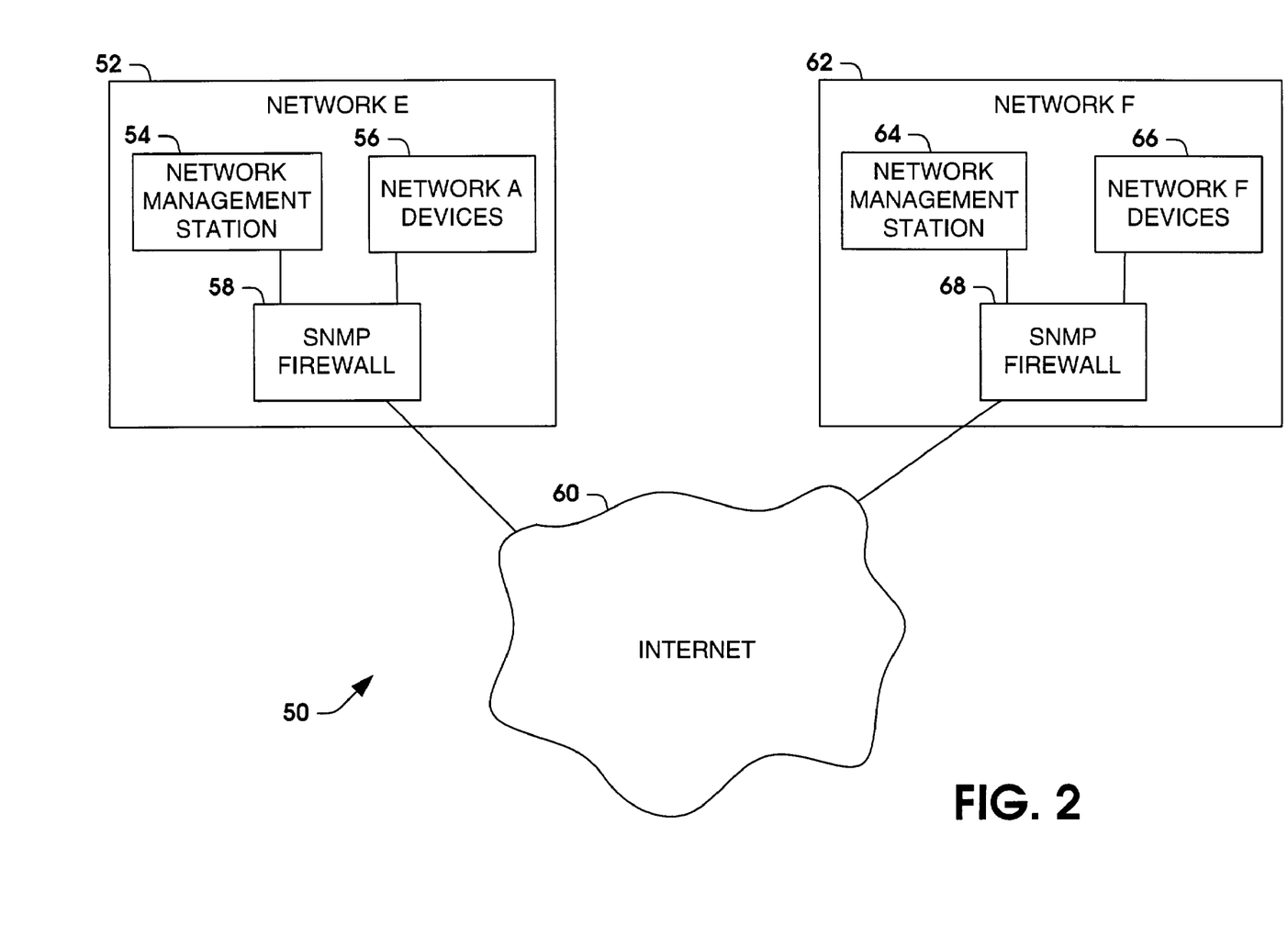
FIG. 2 illustrates a block diagram of two networks coupled to the Internet in accordance with an aspect of the present invention.

It is to be appreciated that each network in an multi-network system (e.g., internet) can be provided with a corresponding SNMP network management station that performs the functions associated with network management, such as that performed by an SNMP manager. Additionally, the SNMP network management station can include functionality associated with providing network community information to SNMP messages. FIG. 2 illustrates a first network 52, labeled network E, coupled to the Internet 60 and a second network 62, labeled network F, coupled to the Internet 60. The first network 52 includes an SNMP firewall 58, a plurality of network devices 56 and a network management station 54. The second network includes an SNMP firewall 68, a plurality of network devices 66 and a network management station 64. An administrator can transmit and receive SNMP messages from either network through the respective network management stations 54 and 64. For example, the administrator can send SNMP messages from the network management station 54 at network A to devices on network B.

The SNMP firewall 58 can include the functionality for accepting the command from the network management station 54 and providing network community or network identification information into the command or SNMP packet. The SNMP packet can then be transmitted over the Internet 60 and intercepted by the SNMP firewall 68. The SNMP firewall 68 can intercept the SNMP packet, extract the network identification information and forward the SNMP packet to the network F device 66 corresponding to the IP address of the destination device in the SNMP packet. A response can then be provided by an SNMP agent residing on a destination device to the SNMP firewall 68. The SNMP firewall 68 provides the network identification information back into the packet and transmits the packet back to the network management station 54 through the Internet 60. Event information such as defined in a "TRAP" PDU can be transmitted in the same manner to the network management station specified in the SNMP firewall, the SNMP agent of the network device itself, or to the SNMP network management station that issued the last PDU request to the network device.

Figure 3:
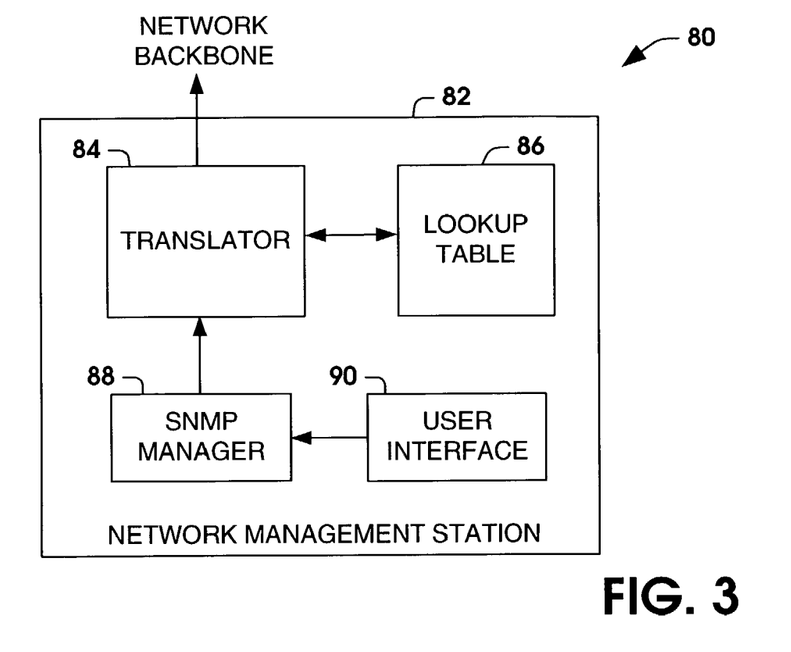
FIG. 3 illustrates a block diagram of a network management station in accordance with an aspect of the present invention.

FIG. 3 illustrates a system 80 for the transmission and receipt of SNMP messages by a network management station 82 in accordance with the present invention. The system 80 includes network management station 82 coupled to a network backbone. The network management station 82 includes a user interface 90 coupled to an SNMP manager 88. A network administrator can transmit PDU commands and receive device status information through the user interface via the SNMP manager 88. The network management station 82 also includes a translator component 84 that utilizes a lookup table 86 to provide network identification information provided by the administrator via the PDU commands to the SNMP message being transmitted over the network backbone. The translator component 84 and the lookup table 86 also allow the SNMP manager 88 to determine network identification information and device IP address information in SNMP agent responses and event information from network devices residing in different networks.

Figure 4:
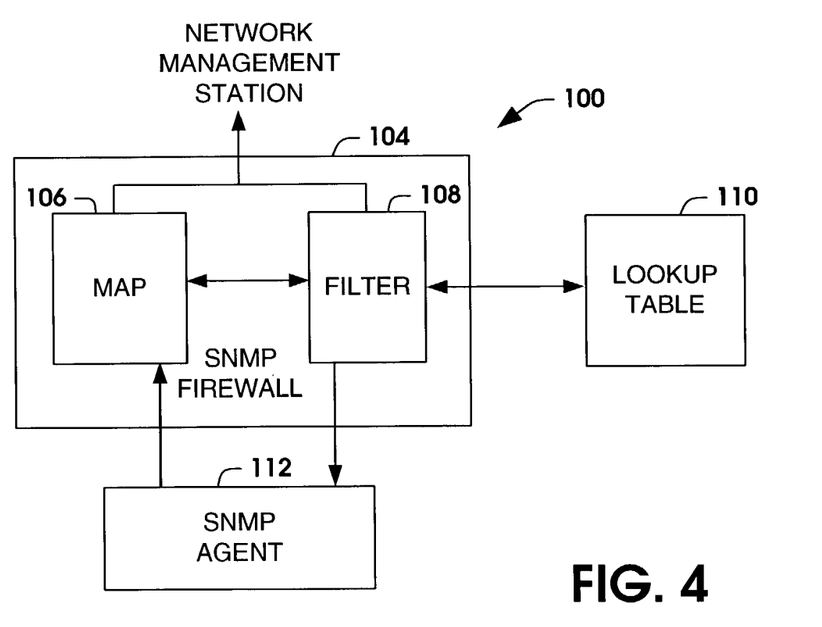
FIG. 4 illustrates a system for the interaction of SNMP messages between an SNMP agent and a network management station in accordance with an aspect of the present invention.

FIG. 4 illustrates a system 100 for the interaction of SNMP messages between an SNMP agent 112 and a network management station (e.g., SNMP manager) in accordance with the present invention. The SNMP agent 112 resides on a network device associated with a particular network. The SNMP agent 112 monitors operation and event information, for example, in a MIB data structure. The system 100 includes an SNMP firewall 104 that includes a map component 106 and a filter component 108. A network management station transmits an SNMP message across a network backbone. The SNMP message (e.g., PDU command) includes a device IP address in addition to network identifier information. The SNMP firewall 104 determines that the SNMP message is destined for a device within the SNMP firewall network. A filter 108 receives the SNMP message and utilizes a lookup table 110 to resolve the actual IP address of the device that the SNMP message was directed.

The SNMP agent 112 transmits response information based on a request from a PDU command from the network management station. Additionally, the SNMP agent 112 transmits event information defined by "TRAPS" residing in the SNMP agent. The map component 106 employs the lookup table to provide an address that includes network identification information in addition to the IP address of the device. The network identification information is then added to the SNMP response or event message so that the network management station can determine from which device and which network that the response and/or event information originates.

Figure 5:
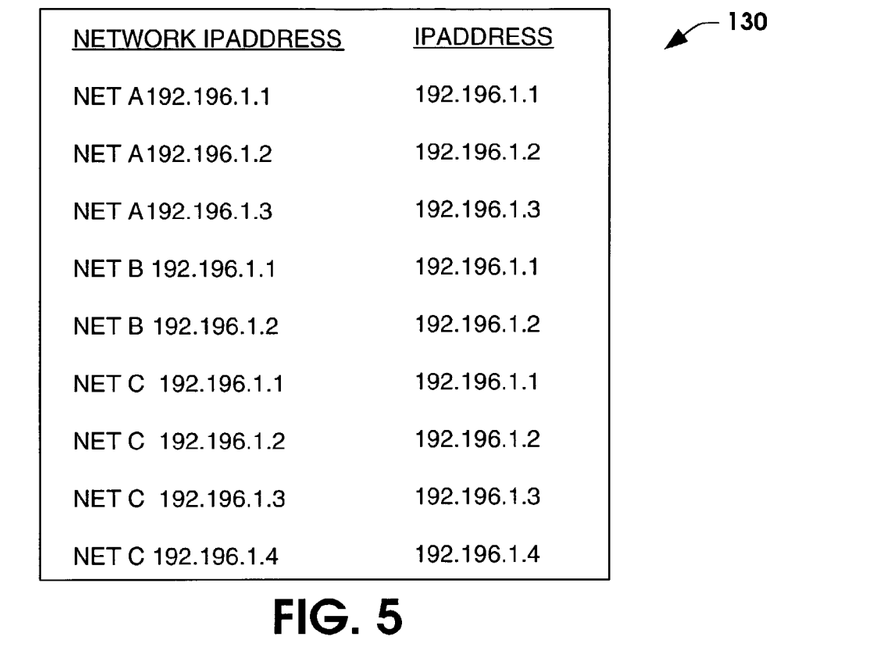
FIG. 5 illustrates an exemplary lookup table that provides network identifiers with corresponding device IP addresses in accordance with an aspect of the present invention.

FIG. 5 illustrates an exemplary lookup table 130 that includes network identification information in accordance with an aspect of the present invention. The exemplary lookup table 130 includes a network and IP address information row and an IP address only row relating to the IP address of destination devices. A network IP address includes the network identification information in addition to the IP address. The IP address of different devices in different networks can include the same IP address, but the devices can be differentiated by the network identification information. The network identification information can be provided in SNMP messages transmitted over an intranet or Intranet connection. The lookup table 130 includes the same IP address for many devices with differentiation being provided by the addition of network identification information. For example, a device in network A, B and C each employ the IP address 192.196.1.1. However, the present invention provides network identification information that allows PDUs to be executed with IP address information and network identification information, so that SNMP messages can be exchanged with multiple devices having the same IP address in different logical networks. An SNMP firewall can utilize the lookup table to resolve the actual IP address of the destination device.

Figure 6:
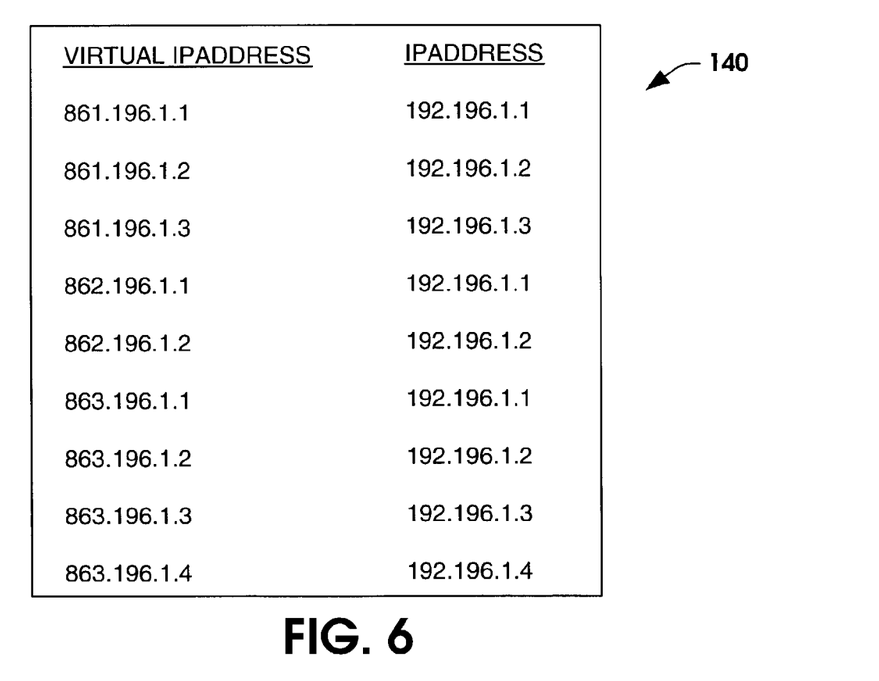
FIG. 6 illustrates an exemplary lookup table that provides virtual IP addresses with corresponding device IP addresses in accordance with an aspect of the present invention.

FIG. 6 illustrates an exemplary lookup table 140 that includes virtual IP addresses corresponding to device IP addresses in different networks in accordance with an aspect of the present invention. The exemplary lookup table 140 includes a virtual IP address with a corresponding IP address relating to the destination device. A virtual IP address provides network identification information to the IP address. The IP address of different devices can include the same IP address, but the devices can be differentiated by the use of virtual IP addresses. The lookup table 140 includes the same IP address for many devices with differentiation be provided by using a virtual IP address that associates the actual IP address with network identification information. For example, a device in network A, B and C each employ the IP address 192.196.1.1. However, the present invention provides a virtual IP address that allows PDUs to be executed with virtual IP address information and the virtual IP address resolved by a corresponding SNMP firewall residing within the destination network. The virtual IP addresses allows a corresponding network to determine that the SNMP message is destined for a device in the destination network, so that SNMP messages can be exchanged with multiple devices having the same IP address in different logical networks.

Figure 7:
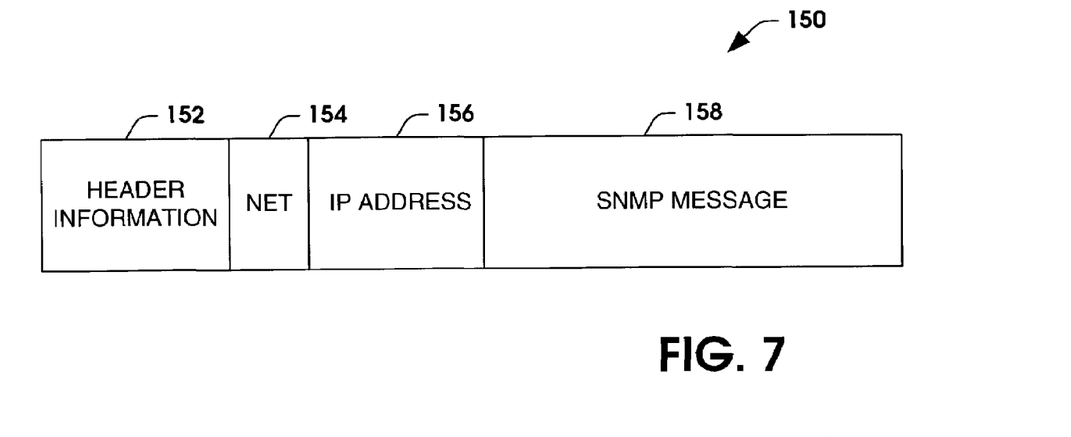
FIG. 7 illustrates an exemplary SNMP packet having network identification information in accordance with an aspect of the present invention.

FIG. 7 illustrates an exemplary SNMP packet 150 having network identification information in accordance with an aspect of the present invention. The SNMP packet 150 includes a header 152, a network identifier 154, a device IP address 156 and an SNMP message 158. An administrator enters a PDU command at a network management station or some other device having an SNMP manager. The network management station builds a packet for transmission over the network (e.g., internet, Internet), which includes a destination device IP address 156 and a network identifier 154. The packet is then transmitted and received by the destination network having an SNMP firewall. The SNMP firewall removes the network identifier from the SNMP packet 150 and forwards the remaining portion of the SNMP packet to the destination device. If the packet is not destined for the network, the SNMP firewall ignores the packet.

Figure 8:
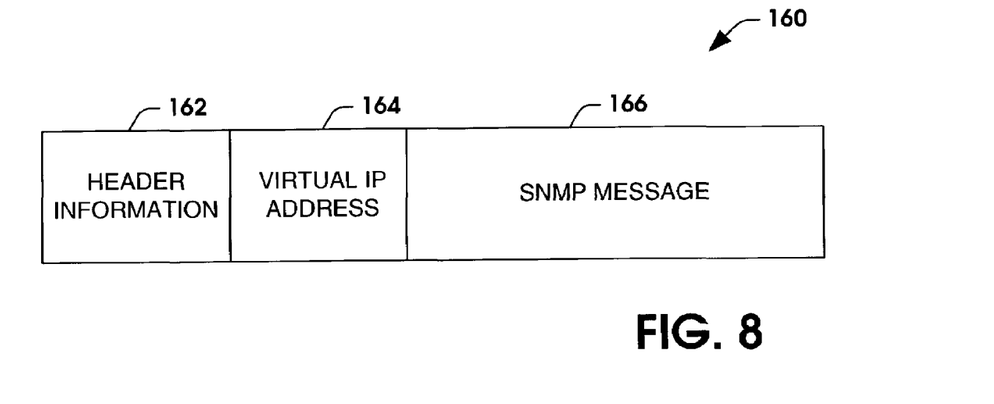
FIG. 8 illustrates an exemplary SNMP packet having a virtual IP address that provides network identification information in accordance with an aspect of the present invention.
Figure 9:
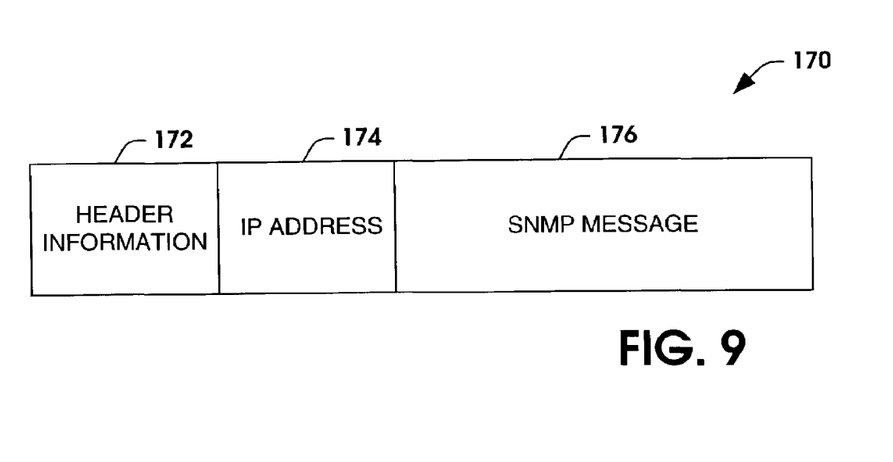
FIG. 9 illustrates an exemplary SNMP packet provided to a destination device from an SNMP firewall in accordance with an aspect of the present invention.

FIG. 8 illustrates an alternate SNMP packet 160 having network identification information in the form of a virtual IP address in accordance with an aspect of the present invention. The network management station builds a packet for transmission over the network (e.g., internet, Internet), which includes a virtual IP address that corresponds to a device destination address and a network identifier. The SNMP packet includes a header 162, a virtual IP address 164 and an SNMP message 166. The packet 160 is then transmitted and received by the destination network having an SNMP firewall. The SNMP firewall resolves the virtual IP address by looking up a corresponding actual IP address, modifying the packet to include the actual IP address and forwarding the modified packet to the destination device. If the packet is not destined for the network, the SNMP firewall ignores the packet. FIG. 9 illustrates an SNMP packet 170 that is transmitted to the destination device from the SNMP firewall. The SNMP packet 170 includes a header 172, a device IP address 174 and an SNMP message 176. The packet 170 is similar to a packet transmitted within a local area network (LAN). The response by the destination device can be rebuilt into a packet having the format illustrated in either FIG. 7 or FIG. 8, and transmitted back to the network management station.

It is to be appreciated that the present invention can be implemented into a system that is wireless or partially wireless in nature. Additionally, dynamic updates to the lookup tables can be provided when devices move from one network to another network. In mobile network environments, capabilities are required for allowing nomadic users to migrate from one logical network or sub-network to other logical networks or sub-networks without human interaction or network management interactions. As the mobile nodes move from one network to the other, the network identification needs to be updated, so that SNMP PDUs can be transmitted to the mobile node or mobile communication unit (MCU) at the proper network. Additionally, the network management station can provide updates to the system when fixed nodes are added to a network.

Figure 10:
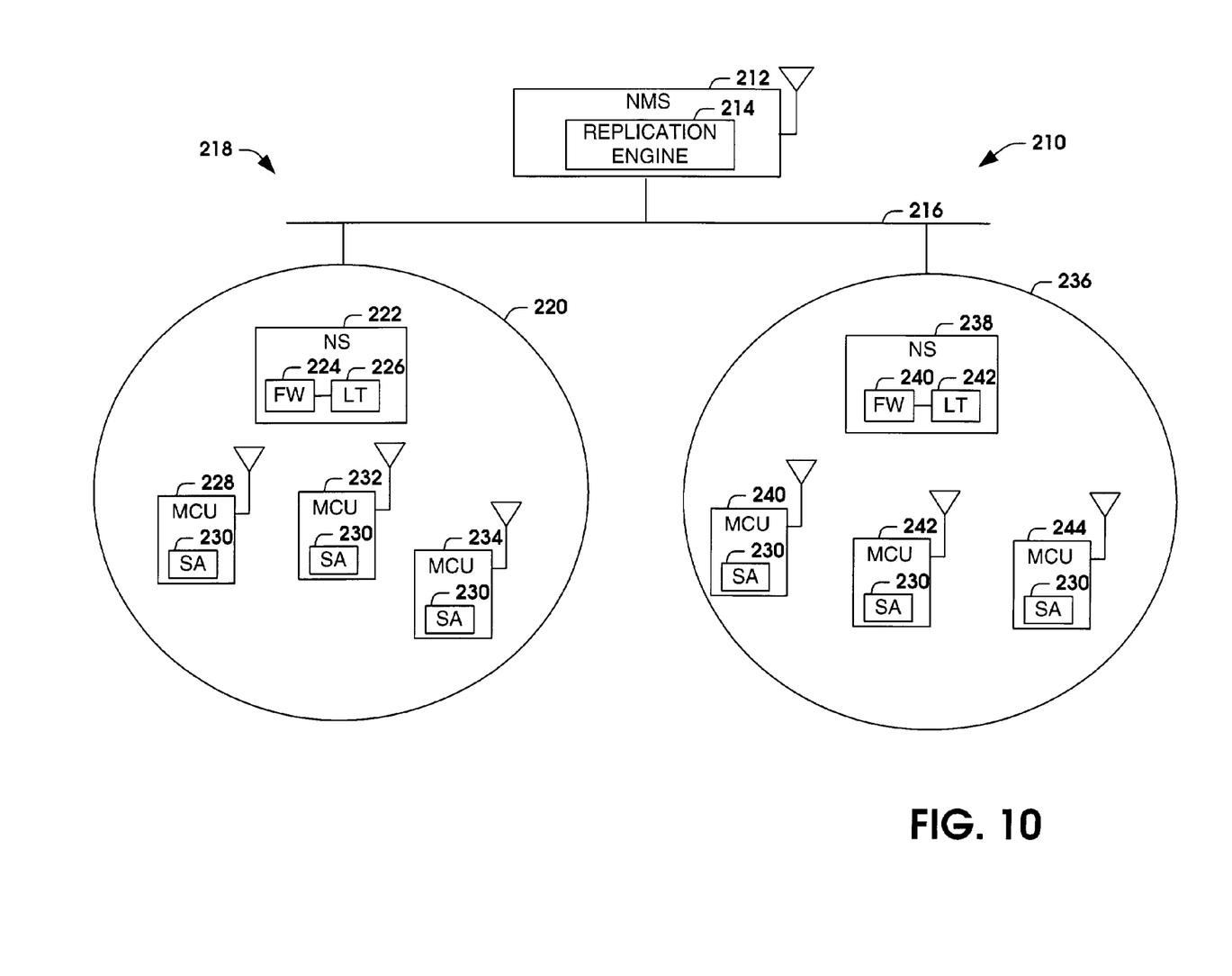
FIG. 10 illustrates a block diagram of a system comprising a plurality of wireless networks in accordance with an aspect of the present invention.

FIG. 10 illustrates a mobile communication system 210 comprising a plurality of logical networks or subnetworks coupled to an ad-hoc backbone 216 to form a parent network 218 (e.g., internet). The mobile communication system 210 includes a first logical network 220 having a network server 222 and a second logical network 236 having a network server 238. The network server 222 includes an SNMP firewall (FW) 224 and a lookup table (LT) 226 for resolving SNMP messages having destination device IP addresses and network identification information. The network server 238 includes an SNMP firewall (FW) 240 and a lookup table (LT) 242 for resolving SNMP messages having destination device IP addresses and network identification information. A plurality of MCUs are associated with the logical networks 220 and 236. The MCUs can move between logical networks and the new network identification information for the MCU updated at one of the network server 222, the network server 238 or the network management station 212 in accordance with the present invention. The network identification information is then replicated to the lookup table 226 and the lookup table 242. For example, a replication engine 214 can replicate an updated lookup table and transmit the updated lookup table to the network server 222 and the network server 238. For a fixed network device, the lookup table can be updated at the network management station 212 and replicated to the other nodes using the replication engine 214.

The first logical network 220 has a first MCU member 228, a second MCU member 232 and a third MCU member 234. The second logical network 236 has a fourth MCU member 240, a fifth MCU member 242 and a sixth MCU member 244. As is conventional, each MCU associates itself, typically by registration, with a logical network coupled to the ad-hoc backbone 216, such that a link is formed between itself and other devices situated on the ad-hoc backbone 216. A geographic cell defines a region of coverage in which successful wireless communication can occur. Depending on the type of antenna selected, output power and RF sensitivity of a respective access point (not shown), the geographic cell may take one of several different forms and sizes.

Each MCU includes an SNMP agent (SA) 230 that monitors operation and event information associated with the MCU. Additionally, the SNMP agent 230 can also respond to SNMP requests from the network management station 212. The messages are transmitted across the ad-hoc backbone 216 and received by the SNMP firewall 224 or 240 of the destination network, which employs the lookup table 226 or 242 to pass the SNMP message to the appropriate MCU. The SNMP firewall 224 or 240 uses the lookup table 226 or 242, respectively, to update the response of the SNMP agent with network identification information. Additionally, the SNMP agents 230 can provide status information to the network management station 212. The SNMP firewall 224 or 240 also uses the lookup table 226 or 242, respectively, to update the event information with network identification information. As MCUs move from one network to the other, the network identification information is provided to the network management station 212 and the lookup tables 226 or 242 are updated dynamically, for example, via the replication engine 214.

Figure 11:
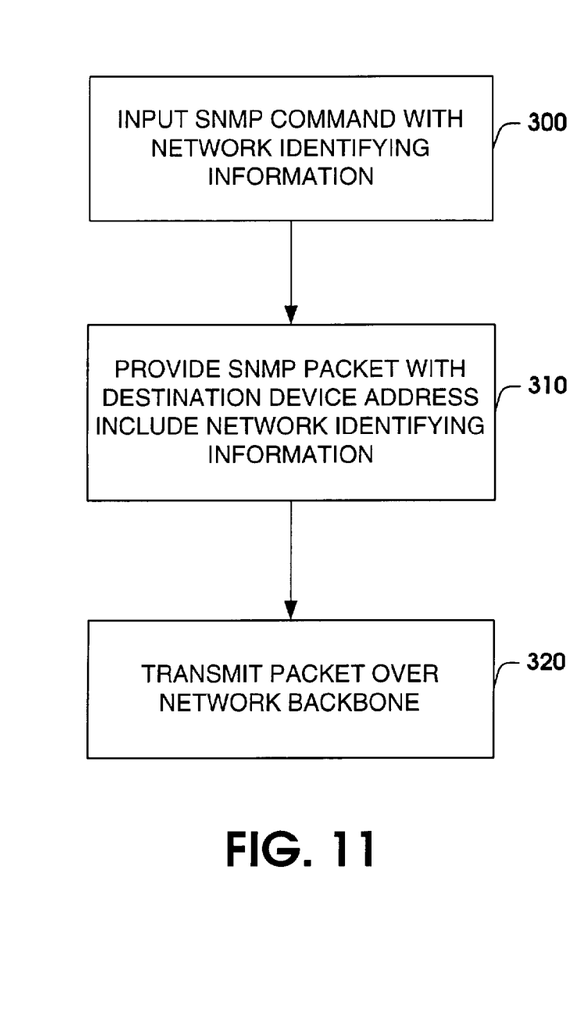
FIG. 11 illustrates a methodology for transmitting an SNMP message from a network management station in accordance with an aspect of the present invention.
Figure 12:
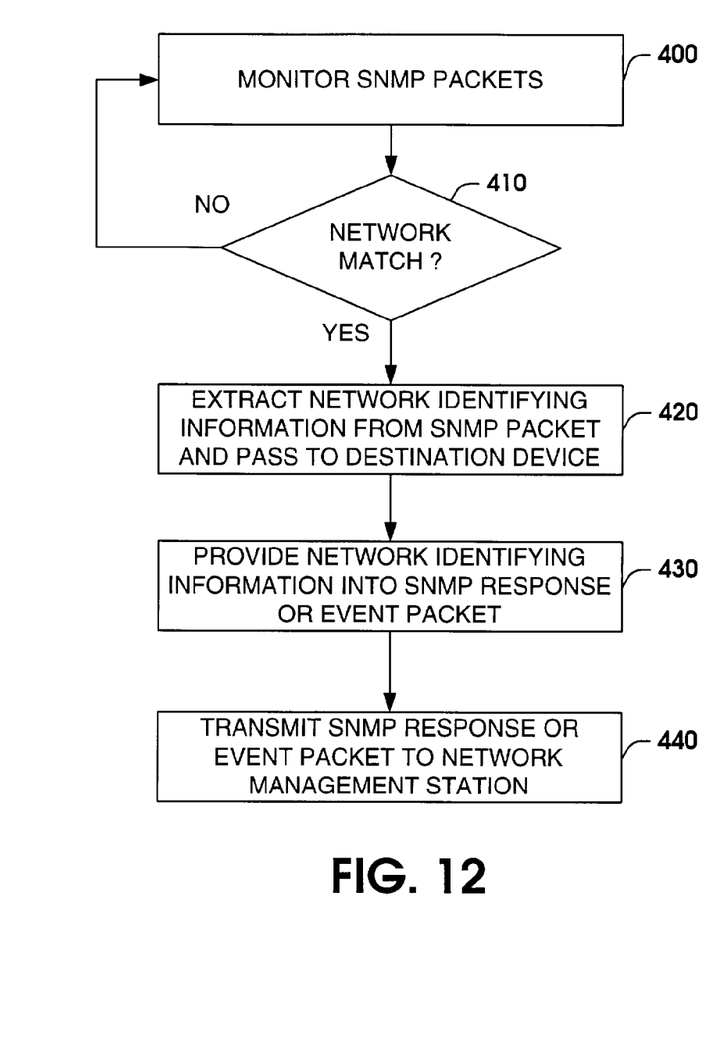
FIG. 12 illustrates a flow diagram of a methodology for determining a destination device for an SNMP packet in a multi-network system in accordance with an aspect of the present invention.

In view of the foregoing structural and functional features described above, methodologies in accordance with various aspects of the present invention will be better appreciated with reference to FIGS. 11-12. While, for purposes of simplicity of explanation, the methodologies of FIGS. 11-12 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 11 illustrates a methodology for transmitting an SNMP message from a network management station in accordance with an aspect of the present invention. The methodology begins at 300 where a network administrator enters an SNMP command that includes network identification information. The methodology then proceeds to 310. At 310, the network management station then builds an SNMP packet with destination device address information and network identification information built into the SNMP packet. For example, the SNMP packet can include a network identifier built into the packet and an IP address corresponding to the destination device for the SNMP packet. Alternatively, the SNMP packet can include a virtual IP address that corresponds to an actual IP address and a particular network. A lookup table can be provided in either case to match IP address information without network identification information with IP address information with network identification information. The methodology then proceeds to 320. At 320, the SNMP packet is transmitted over the network backbone of the multi-network system (e.g., intranet, Internet).

FIG. 12 illustrates a methodology for determining a destination device for an SNMP packet in a multi-network system having the possibility of duplicate IP addresses in different networks in accordance with an aspect of the present invention. The methodology begins at 400 where SNMP packets are monitored at a network in a multi-network system. It is to be appreciated that multiple networks can be monitoring the SNMP packets concurrently. At 410, the methodology determines if network identification information corresponds to the monitoring network, such that the SNMP packet is destined for a device in the monitoring network. If the SNMP packet does not include network identification information corresponding to the monitoring network (NO), the methodology returns to 400 to continue monitoring SNMP packets. If the SNMP packet does include network identification information corresponding to the monitoring network (YES), the methodology proceeds to 420.

At 420, the network identification information from the SNMP packet is extracted, and the SNMP packet is forwarded to the destination device based on the IP address of the destination device in the SNMP packet. For example, the network information can be provided as a network identifier field residing in the SNMP packet. Alternatively, the network information can be provided by associating a virtual IP address with a device and its associated network. The network then proceeds to 430. The destination device then provides a response to the SNMP packet via an SNMP agent. At 430, the methodology provides network identification information into an SNMP response packet. Alternatively, the response packet can be an SNMP event packet containing event information defined by one or more "TRAP" PDUs. At 440, the SNMP response or event packet is transmitted to the network management station.

Figure 13:
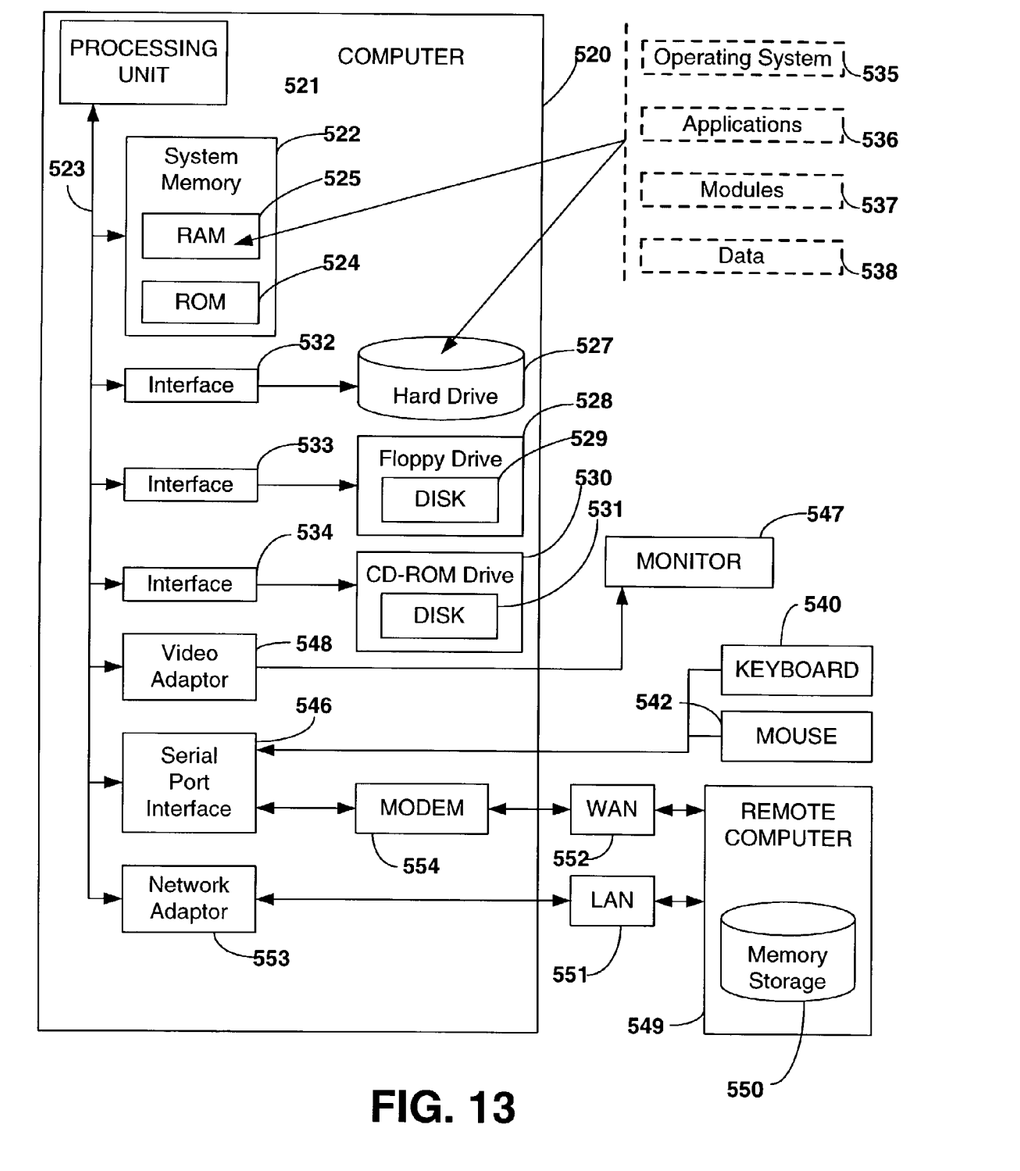
FIG. 13 illustrates a schematic block diagram of an exemplary operating environment for a system configured in accordance with the present invention.

In order to provide a context for the various aspects of the invention, FIG. 13 and the following discussion are intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules.

Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 13, an exemplary system for implementing the various aspects of the invention includes a conventional server computer 520, including a processing unit 521, a system memory 522, and a system bus 523 that couples various system components including the system memory to the processing unit 521. The processing unit may be any of various commercially available processors. Dual microprocessors and other multi-processor architectures also can be used as the processing unit 521. The system bus may be any of several types of bus structure including a memory bus or memory controller, a peripheral bus, and a local bus using any of a variety of conventional bus architectures. The system memory includes read only memory (ROM) 524 and random access memory (RAM) 525. A basic input/output system (BIOS), containing the basic routines that help to transfer information between elements within the server computer 520, such as during start-up, is stored in ROM 524.

The server computer 520 further includes a hard disk drive 527, a magnetic disk drive 528, e.g., to read from or write to a removable disk 529, and an optical disk drive 530, e.g., for reading a CD-ROM disk 531 or to read from or write to other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer-readable media provide nonvolatile storage of data, data structures, computer-executable instructions, etc. for the server computer 520. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 525, including an operating system 535, one or more application programs 536, other program modules 537, and program data 538. A user may enter commands and information into the server computer 520 through a keyboard 540 and a pointing device, such as a mouse 542. Other input devices (not shown) may include a microphone, a joystick, a game pad, a satellite dish, a scanner, or the like. These and other input devices are often connected to the processing unit 521 through a serial port interface 546 that is coupled to the system bus, but may be connected by other interfaces, such as a parallel port, a game port or a universal serial bus (USB). A monitor 547 or other type of display device is also connected to the system bus 523 via an interface, such as a video adapter 548. In addition to the monitor, computers typically include other peripheral output devices (not shown), such as speakers and printers.

The server computer 520 may operate in a networked environment using logical connections to one or more remote computers, such as a remote client computer 549. The remote computer 549 may be a workstation, a server computer, a router, a peer device or other common network node, and typically includes many or all of the elements described relative to the server computer 520, although only a memory storage device 550 is illustrated in FIG. 13. The logical connections depicted in FIG. 13 include a local area network (LAN) 551 and a wide area network (WAN) 552. Such networking environments are commonplace in offices, enterprise-wide computer networks, intranets and the Internet.

When used in a LAN networking environment, the server computer 520 is connected to the local network 551 through a network interface or adapter 553. When used in a WAN networking environment, the server computer 520 typically includes a modem 554, or is connected to a communications server on the LAN, or has other means for establishing communications over the wide area network 552, such as the Internet. The modem 554, which may be internal or external, is connected to the system bus 523 via the serial port interface 546. In a networked environment, program modules depicted relative to the server computer 520, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer 520, unless otherwise indicated. Such acts and operations are sometimes referred to as being computer-executed. It will be appreciated that the acts and symbolically represented operations include the manipulation by the processing unit 521 of electrical signals representing data bits which causes a resulting transformation or reduction of the electrical signal representation, and the maintenance of data bits at memory locations in the memory system (including the system memory 522, hard drive 527, floppy disks 529, and CD-ROM 531) to thereby reconfigure or otherwise alter the computer system's operation, as well as other processing of signals. The memory locations where such data bits are maintained are physical locations that have particular electrical, magnetic, or optical properties corresponding to the data bits.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for exchanging Simple Network Management Protocol (SNMP) messages in a multi-network intranet, the system comprising:
    a network management station that transmits SNMP messages containing a device address and network identification information corresponding to a destination device of an SNMP message; and
    a plurality of networks coupled together to form an intranet, the plurality of networks having a respective SNMP firewall, the SNMP firewall extracts the network identification information to determine if an SNMP message is destined for a device residing in the respective network, the SNMP firewall removes the network identification information from the SNMP message and forwards the SNMP message to a device associated with the device address.

2. The system of claim 1, the device being one of a computer, a router, a bridge, a printer and a mobile communication unit.

3. The system of claim 1, the SNMP firewall employs a lookup table to determine an associated device address corresponding to the device address and the network identification information.

4. The system of claim 1, the network management station inserts a network identifier into the SNMP message to provide the network identification information.

5. The system of claim 1, the network management station provides a virtual address into the SNMP message to provide the network identification information.

6. The system of claim 1, the network management station further comprises a user interface that allows an administrator to transmit SNMP commands that include network identification information.

7. The system of claim 1, the SNMP firewall provides network identification information to at least one of SNMP response messages and SNMP event messages provided by an SNMP agent residing on a destination device prior to transmission of the at least one of SNMP response messages and SNMP event messages to the network management station.

8. The system of claim 7, the SNMP firewall comprising a filter component that extracts network identification information from SNMP messages transmitted from the network management stations and a map component that provides network identification information to the at least one of SNMP response messages and SNMP event messages to the network management station.

9. The system of claim 1, the device address being an Internet Protocol (IP) address.

10. The system of claim 9, at least two devices in different networks of the plurality of networks have duplicate IP addresses.

11. The system of claim 1, the intranet being the Internet.

12. The system of claim 1, at least one of the plurality of networks being a wireless network.

13. The system of claim 1, further comprising a replication engine that updates a lookup table when a new member enters one of the plurality of networks, the lookup table contains network identification information and corresponding device addresses, the SNMP firewall utilizing the lookup table to locate a destination device.

14. A network management station for transmitting Simple Network Management Protocol (SNMP) messages to devices in a plurality of networks with possibly conflicting Internet Protocol (IP) addresses, the station comprising:
- a user interface that allows an administrator to enter SNMP commands for a device that contain network identification information and an IP address of the device; and
- an SNMP manager that transmits SNMP packets that contain the network identification information provided by the administrator and removes, at an SNMP firewall, the network identification information from the SNMP packets and forwards the SNMP packets to the device.

15. The station of claim 14, further comprising a translator that employs a lookup table to provide the network identification information into the SNMP packets.

16. The station of claim 14, the network identification information being a network identifier inserted into the SNMP packets.

17. The station of claim 14, the network identification information being provided by replacing the IP address of the device with a virtual IP address.

18. A computer having a processor and a computer readable medium having computer executable instructions, the computer executable instructions comprising:
- a filter component of an SNMP firewall that extracts network identification information from SNMP messages that contain network identification information and device address information to determine if an SNMP message is destined for a device residing in a network associated with the filter component, the filter component removes the network identification information from the SNMP message and forwards the SNMP message to a device associated with the device address information; and
- a map component of the SNMP firewall that provides network identification information to at least one of SNMP response messages and SNMP event messages received from an SNMP agent that resides on a device to be transmitted to a network management station.

19. The computer of claim 18, the filter component and the map component employ a lookup table to determine an associated device address corresponding to the device address and the network identification information.

20. A method for exchanging Simple Network Management Protocol (SNMP) messages between a network management station and a destination device, the method comprising:
- inputting an SNMP command for a device with network identification information and an IP address of the device at a network management station;
- providing an SNMP packet with network identification information in response to the SNMP command;
- transmitting the SNMP packet with the network identification information over a network backbone connecting a plurality of networks that form an intranet;
- removing, at an SNMP firewall, the network identification information from the SNMP packet; and
- forwarding, at the SNMP firewall, the SNMP packet to the device.

21. The method of claim 20, the providing an SNMP packet with network identification information in response to the SNMP command comprising inserting a network identifier into the SNMP packet.

22. The method of claim 20, the providing an SNMP packet with network identification information in response to the SNMP command comprising replacing the IP address of the device with a virtual IP address.

23. A method for determining a destination device for a Simple Network Management Protocol (SNMP) packet in a multi-network system having the possibility of duplicate Internet Protocol (IP) addresses in different networks, the method comprising:
- monitoring, at an SNMP firewall, SNMP packets from at least one network in the multi-network system;
- determining, at the SNMP firewall, if an SNMP packet includes network identification information and an IP address associated with the destination corresponding to the monitored network; and
- removing, at the SNMP firewall, the network identification information from the SNMP packet and forwarding the SNMP packet to a destination device corresponding to the IP address associated with the destination.

24. The method of claim 23, further comprising providing an SNMP response packet from the destination device with network identification information and transmitting the SNMP response packet to a network management station.

25. The method of claim 23, further comprising providing an SNMP event packet from the destination device with network identification information and transmitting the SNMP event packet to a network management station.

26. A computer system for exchanging Simple Network Management Protocol (SNMP) messages in a multi-network intranet, wherein each network of the multi-network intranet includes at least one device, the system comprising:
- means for transmitting SNMP messages containing a device address and network identification information corresponding to a destination device of an SNMP message;
- means for extracting the network identification information to determine if an SNMP message is destined for a device residing in the respective network;
- means for removing the network identification information from the SNMP message; and
- means for forwarding the SNMP message to a device associated with the device address.

27. The computer system of claim 26, further comprising means for providing an SNMP response packet from the destination device with network identification information and transmitting the SNMP event packet to a network management station.

28. The computer system of claim 26, further comprising means for providing an SNMP event packet from the destination device with network identification information and transmitting the SNMP event packet to a network management station.

* * * * *